US008750256B2

(12) United States Patent
Qiu et al.

(10) Patent No.: US 8,750,256 B2
(45) Date of Patent: Jun. 10, 2014

(54) METHOD AND APPARATUS FOR SERVICE CONFIGURATION AND RATE MATCHING OF TIME DIVISION-SYNCHRONOUS CODE DIVISION MULTIPLE ACCESS SYSTEM

(75) Inventors: Ning Qiu, Guangdong Province (CN); Qiang Li, Guangdong Province (CN); Haifeng Ni, Guangdong Province (CN); Wenqi Zeng, Guangdong Province (CN); Xuehong Tian, Guangdong Province (CN); Jiwen Wang, Guangdong Province (CN); Jian Cheng, Guangdong Province (CN); Yu Chen, Guangdong Province (CN); Min Bi, Guangdong Province (CN); Xiaolong Ran, Guangdong Province (CN); Fanping Du, Guangdong Province (CN); Lihong Liang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 131 days.

(21) Appl. No.: 13/258,079

(22) PCT Filed: Mar. 31, 2010

(86) PCT No.: PCT/CN2010/071468
§ 371 (c)(1),
(2), (4) Date: Sep. 21, 2011

(87) PCT Pub. No.: WO2011/038583
PCT Pub. Date: Apr. 7, 2011

(65) Prior Publication Data
US 2012/0082053 A1    Apr. 5, 2012

(30) Foreign Application Priority Data

Sep. 30, 2009  (CN) .......................... 2009 1 0179709

(51) Int. Cl.
*H04B 7/216*   (2006.01)
*H04L 1/00*   (2006.01)

(52) U.S. Cl.
CPC ............ *H04L 1/0068* (2013.01); *H04L 1/0052* (2013.01)
USPC ............ 370/335; 370/336; 370/337; 370/342

(58) Field of Classification Search
CPC .......................... H04B 7/2628; H04B 7/2643
USPC .......................... 370/335, 336, 337, 342, 479
See application file for complete search history.

(56) References Cited

U.S. PATENT DOCUMENTS

| 7,415,043 B2 * | 8/2008 | Kaewell et al. ............... 370/479 |
| 2005/0053166 A1 * | 3/2005 | Le Strat et al. ............... 375/260 |
| 2005/0195769 A1 * | 9/2005 | Kaewell et al. ............... 370/335 |

FOREIGN PATENT DOCUMENTS

| CN | 1638293 A | 7/2005 |
| CN | 101667889 A | 3/2010 |
| EP | 1883162 A1 | 1/2008 |

OTHER PUBLICATIONS

International Search Report for PCT/CN2010/071468 dated Jun. 25, 2010.

*Primary Examiner* — Chuong T Ho
(74) *Attorney, Agent, or Firm* — Ling Wu; Stephen Yang; Ling and Yang Intellectual Property (57) ABSTRACT

A method for configuring a service and a method and apparatus for rate matching in a TD-SCDMA system, this method for configuring the service includes: taking that a check bit puncturing ratio should be more than 7i+a or less than 7i−a as a newly added constraint condition, and the check bit puncturing ratios of each configured service being outside a range of [7i+a, 7i−a], the method for rate matching includes: when puncturing each path of check bits of the current data block, if a difference between a position $P_k$ of $k^{th}$ reserved check bit calculated according to a method defined by the service and a previously determined position $NP_{k-1}$ of k−1$^{th}$ reserved check bit is a positive integral multiple of 7, determining a position $NP_k$ of k$^{th}$ reserved check bit as $P_k$ plus 1 or $P_k$ minus 1, and $P_k$ plus 1 and $P_k$ minus 1 requiring carrying out alternately.

20 Claims, 6 Drawing Sheets

METHOD AND APPARATUS FOR SERVICE CONFIGURATION AND RATE MATCHING OF TIME DIVISION-SYNCHRONOUS CODE DIVISION MULTIPLE ACCESS SYSTEM

TECHNICAL FIELD

The present invention relates to the mobile communication field in the communication and information technique, and more particularly, to a method for configuring a service in a TD-SCDMA system and a method for rate matching.

BACKGROUND OF THE RELATED ART

Figure 1:
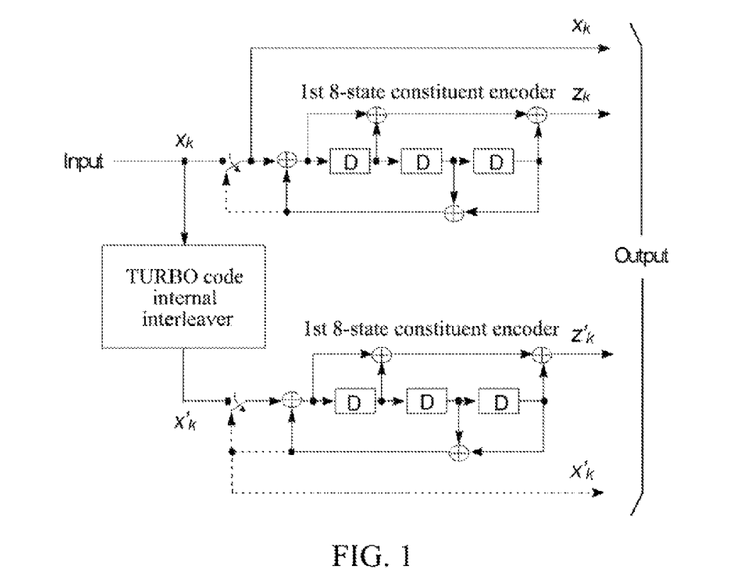
FIG. 1 is a structure schematic diagram of the Turbo encoder with encoding rate of 1/3, and the dash line in the figure is only suitable for the trellis termination.

The Time Division-Synchronous Code Division Multiple Access (TD-SCDMA) is one of three mainstream standards of the 3G, and has a wide application prospect, wherein the composition of the Turbo encoder defined in the protocol is a Parallel Concatenated Convolutional Code (PCCC), which comprises two 8-state constituent encoders and one Turbo code internal interleaver. The encoding rate of the Turbo coder is 1/3, of which the structure is as shown in FIG. 1.

The transfer function of the 8-state constituent code for the PCCC is:

$$G(D) = \left[1, \frac{g_1(D)}{g_0(D)}\right],$$

wherein $g0(D) = 1 + D2 + D3$ $g1(D) = 1 + D + D3$ wherein D, D2 and D3 refer to the number of delayed clocks of the tap position relative to the input data, and 1 denotes that the tap position is the input data, D denotes that the tap position is delayed for 1 clock relative to the input data, and D2 denotes that the tap position is delayed for 2 clocks relative to the input data, and so on.

The initial value of the shift register shall be configured to all zeros when starting to encode the input bits.

The output of the Turbo encoder is:

$x_1, z_1, z'_1, x_2, z_2, z'_2, \ldots, x_K, z_K, z'_K,$ wherein $x_1, x_2, \ldots, x_K$ are the bits input to the Turbo encoder namely the first 8-state constituent encoder and Turbo code internal interleaver, K is the number of bits, and $z_1, z_2, \ldots, z_K$ and $z'_1, z'_2, \ldots, z'_K$ are the bits output from the first and second 8-state constituent encoders respectively.

The bits output from Turbo code internal interleaver are denoted as $x'_1, x'_2, \ldots, x'_K$, and these bits are to be input to the second 8-state constituent encoder.

Rate matching refers to bits on a Transport Channel (TrCh) being repeated or punctured. The higher layer assigns one rate matching attribute for each transport channel. This attribute is semi-static and can only be changed through the higher layer signaling. When the number of bits to be repeated or punctured is calculated, the rate matching attribute requires using.

The number of bits in one transport channel can change in different transmission time intervals. If the number of bits changes in different transmission time intervals, bits will be repeated so as to ensure the total bit rate after multiplexing the TrCHs is the same with the total channel bit rate of the assigned physical channel.

Bit separation and collection in rate matching

Figure 2:
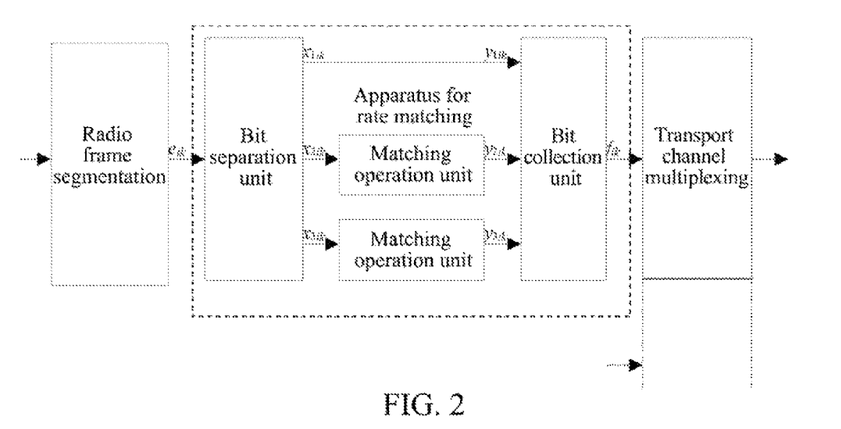
FIG. 2 is a schematic diagram of the puncturing of the Turbo encoded TrCH.

The structure of the apparatus for the rate matching is as shown in FIG. 2, which comprises a bit separation unit, two matching operation units and a bit collection unit. The systematic bits, the first parity check bits, and the second parity check bits in the bit sequence input to the apparatus for rate matching are therefore separated into three sequences. The systematic bits of Turbo encoded TrCH shall not be punctured, and the first parity check bits and the second parity check bits can be punctured when the matching operation unit carries out the matching operation.

Wherein the second sequence includes: all of the first parity check bits from the Turbo encoded TrCHs, except those that go into the first sequence when the total number of bits is not a multiple of three, and some of the systematic bits, first and second parity check bits that are for Trellis termination.

The third sequence includes: all of the second parity check bits from Turbo encoded TrCHs, except those that go into the first sequence when the total number of bits is not a multiple of three, and some of the systematic bits, first and second parity check bits that are for Trellis termination.

The second and third sequences shall be of equal length, whereas the first sequence can include 0 to 2 bits more. Puncturing is applied only to the second and third sequences.

Briefly speaking, when the data length which should be practically transmitted is less than the data length generated by the Turbo encoder, the puncturing operation is completed during the rate matching. The Turbo encoding result is divided into three parts of systematic bits, the first path of check bits and the second path of check bits, wherein the systematic bits are not punctured, and data of two paths of check bits are deleted on the deletion principle as equalized as possible to make the total length of the systematic bits plus left data of two paths of check bits to be equal to the data length which should be transmitted practically after puncturing.

However, according to certain data rates configured by the protocol, if parameters are matched according to the rates defined in the protocol when the length of the Turbo code block is 4367, the decoding performance of the Turbo code is severely degraded at least 3 dB.

SUMMARY OF THE INVENTION

The technical problem to be solved in the present invention is to provide a method for configuring a service in a TD-SCDMA system, which can avoid the severe degradation of the decoding performance at certain specific data rates.

Another technical problem to be solved in the present invention is to provide a method for rate matching in a TD-SCDMA system, and this method does not have the problem of the severe degradation of the decoding performance at certain specific data rates.

In order to research on the main problems and standardize the analysis platform, a new analysis platform comprises a Turbo encoder, a standard equalization puncturing module, a channel, a standard equalization de-puncturing module, and a decoder, wherein the Turbo code internal interleaver is replaced by the random interleaver, and the standard equalization puncturing operation executed by the standard equalization puncturing module is defined as: for the sequence y1, y2, ... yN, when the puncturing rate is pr and the initial phase is pp (the value range is 0~pr−1), the reserved data after puncturing are y(pp), y(pr+pp), y(2*pr+pp), ..., y(k*pr+pp), (pp), (pr+pp) and so on, which denote the positions where the reserved data are situated before puncturing, and in this paper, "*" denotes the multiplication operation.

In order to conveniently describe cases of different puncturing densities in the following text, this paper calls the ratio of the summation of the number of check bit data before puncturing to the summation of the number of reserved check bit data after puncturing as the puncturing ratio.

Firstly, the characteristics of two kinds of services are researched, and the check bit puncturing ratio pr of the service of the code length 4367 approximately is 6.94, and the puncturing ratio pr of the service of the code length 4598 approximately is 8.89, which are standardized to 7 and 9.

Figure 3:
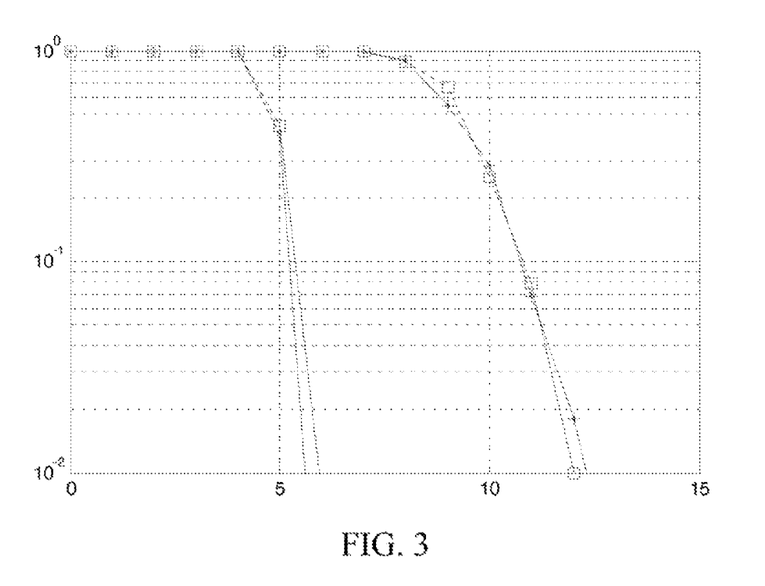
FIG. 3 is a schematic diagram of the performance comparison of the service with the code length of 4598 and code length of 4367 when the puncturing ratios are 7 and 9.

FIG. 3 compares the influence under these two puncturing ratios of these two code lengths, and the horizontal coordinate denotes the Signal to Noise Ratio (SNR), and the vertical coordinate denotes the Block Error Rate (BLER), wherein the curve with the frame denotes the service with the code length of 4594, the curve with the asterisk denotes the service with the code length 4367, the two curves at the right side are the performance curves when the puncturing ratio is 7, and the two curves at the left side are the performance curves when the puncturing ratio is 9. It can be seen that the performance of the service with the code length 4594 which has the normal performance originally also degrades severely under the puncturing ratio of 7, and the service with the code length 4367 of which the performance degrades originally can work normally under the puncturing ratio of 9. That is to say that this performance degradation is irrelative to the code length, and it is the result caused by the specific puncturing ratio.

Figure 4:
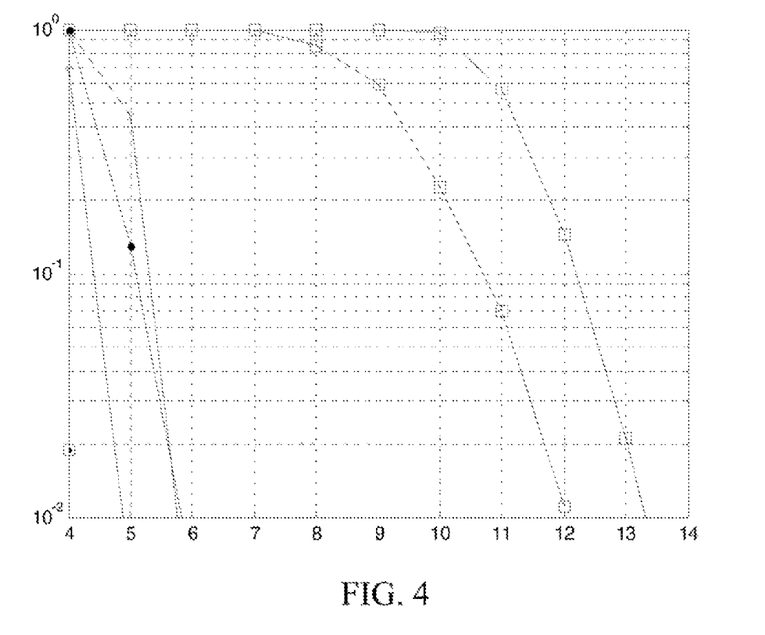
FIG. 4 is a schematic diagram of the performances of the service with the code length of 4367 when the puncturing ratios are 5~9 and when not encoded.

Hence, the code length is fixed to 4367 to analyze the relationship between the puncturing ratio and the performance. The changing performances of the service with the code length of 4367 are compared when the puncturing ratios are 5~9 in FIG. 4, and the horizontal and vertical coordinates of the FIG. 4 are the same with that of FIG. 3. The performance without encoding is added in addition for the convenience of the comparison, wherein the curves starting from the most left side to the right with the frame, asterisk, dot and X in sequence respectively correspond to the puncturing ratios of 5, 6, 8 and 9, and the 2nd curve from the right to the left corresponds to the puncturing ratio of 7, and the black line at the most right side is the curve of the BPSK modulation without encoding. It can be seen from the figure that the decoding performances under other puncturing ratios except 7 are all normal basically. The performance degradation is very severe when the puncturing ratio is 7, and the performance advantage in the case of transmitting nearly 30% redundancy more, comparing with the BPSK without encoding from a perspective of SNR, is not obvious, and if the code repeat gain 1.07 dB of this part of redundancy is deducted, the difference of the performance will be less. That is to say, the decoding gain on the BLER of the Turbo code in this scenario is nearly lost completely.

Figure 5:
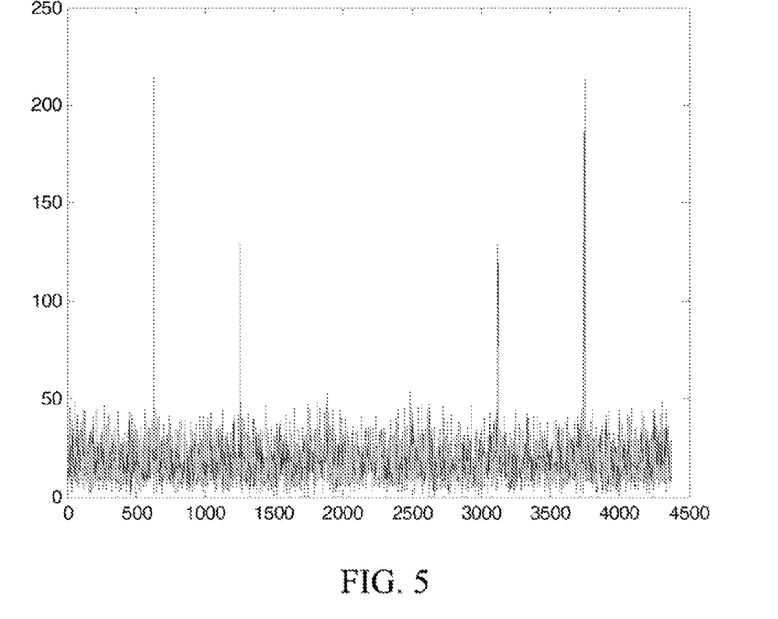
FIG. 5 is a schematic diagram of the statistical frequency domain characteristic of the bit error positions in 10 thousand code blocks when the signal to noise ratio is 8 dB.

In order to further analyze the characteristic of error position when the puncturing ratio is 7, FIG. 5 sums up the frequency domain characteristic of the bit error positions in 10 thousand code blocks when the signal to noise ratio is 8 dB, and the horizontal coordinate in the figure is the frequency unit after the FFT transformation, whose range is 0~4366, and the vertical coordinate is the power spectral density. It can be seen from the figure that the bit error positions have a very obvious characteristic in the frequency domain, wherein there is a very high peak at the position where the normalized frequency is 7, that is to say, there is a very large probability of error which evenly occurs in the period of 7 points.

Figure 6:
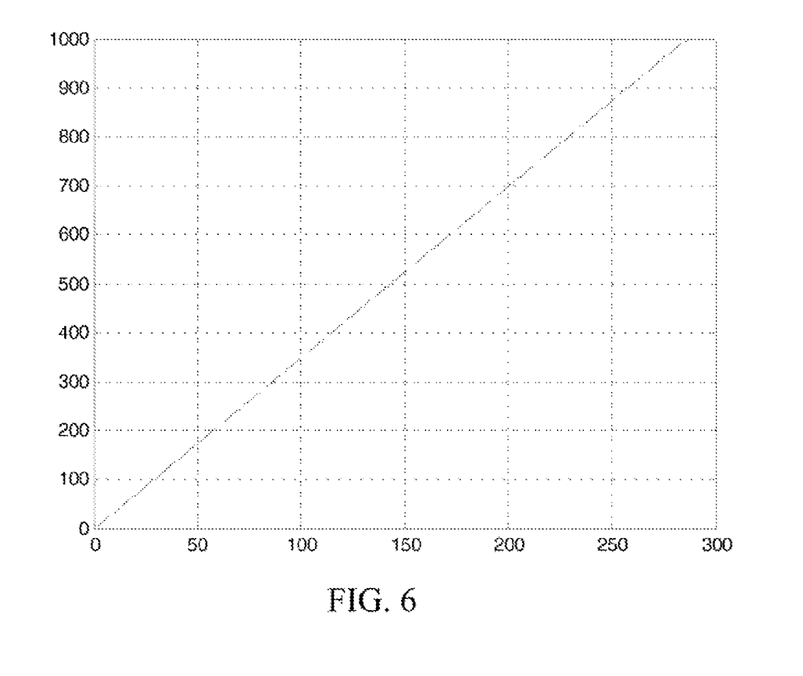
FIG. 6 is a schematic diagram of positions of systematic bits which do not associate with the reserved check bits when the puncturing ratio is 7.

After removing the possibility of error occurring in the decoder, the reason is searched on the encoding and puncturing ways. It is known that the decoding gain of the single decoder comes from the correction function served by check bits for the systematic bits, namely each systematic bit carries out the correction by use of the check bit information associated to this systematic bit. Therefore, if a certain systematic bit does not have any associated check bit, then this systematic bit is unable to correct the error occurring in the transmission process no matter what decoding method is used. Below it will discuss whether there is such a systematic bit in the case that the puncturing ratio is 7. The positions of systematic bits which do not associate with any reserved check bits can be derived by the theory analysis and the iteration solution in the case that the puncturing ratio is 7, which are as shown in FIG. 6, and the horizontal coordinate in the figure denotes serial numbers of systematic bits which lose the check bit protection, denoting which systematic bit losing the check bit protection it is; the vertical coordinate is the position of this systematic bit losing the check bit protection in the systematic bits. It can be seen that when the puncturing ratio is 7, there is a great many of systematic bits losing the check bit protection, and these systematic bits occur in pair in a period of 7, and it can be analyzed that the positions (if there are N systematic bits all together, then their serial numbers are 1~N according to the time sequence of the occurrence, and the position of a certain systematic bit is defined as the serial number of this systematic bit) of these systematic bits losing the check bit protection satisfy the expressions $7*k+pp-4$ and $7*k+pp-4+1$, wherein k is a positive integer, and briefly speaking, the occurrence law is that every 5 systematic bits with protection are followed by 2 systematic bits without protection, then followed by 5 systematic bits with protection and so on. It should be pointed out that the change of the puncturing initial phase pp only will cause the same phase shift at these positions, which does not have practical affects on the result.

Figure 7:
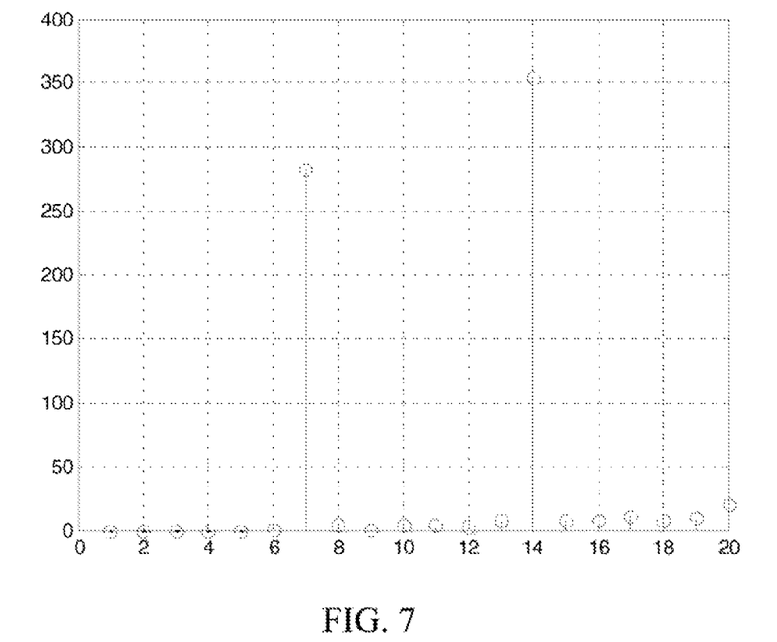
FIG. 7 is a schematic diagram of the number of systematic bits losing the protection in the case of each puncturing ratio when the code length is 1000.

The traverse search will be carried out for puncturing ratios from 1 to 20 to obtain the number of systematic bits losing protection in the case of each puncturing ratio when the code length is 1000, and as shown in FIG. 7, the horizontal coordinate of the figure denotes the puncturing ratio, and the vertical coordinate denotes the number of systematic bits losing protection. It can be seen that this phenomenon occurs only in the case that the puncturing ratio is the multiple of 7. Theory analysis denotes that the essential reason for this phenomenon is that the systematic bit information used by the generation polynomial of the check information of the systematic iteration encoder occurs in the period of 7, and the puncturing way should avoid the same period with this expression to be able to ensure that each systematic bit is protected by the check bit in the case of the sufficient code length.

It should be described additionally that the Turbo code is a kind of parallel concatenated codes, and the above description is only the systematic bits which are unable to be checked by a single member encoder, and a part of systematic bits which are unable to be checked by the single member encoder will be checked by check bits of another single member encoder through the relationship of the interleaving and de-interleaving. It is assumed that the internal interleaver is random sufficiently and the occurrence probability of the systematic bit without protection of the single encoder is P, and then the proportion of the systematic bits which are without protection all the time is P*P from a perspective of the Turbo decoding. For example, when the puncturing ratio is 7, P is 2/7, and P*P is 4/49.

Figure 8:
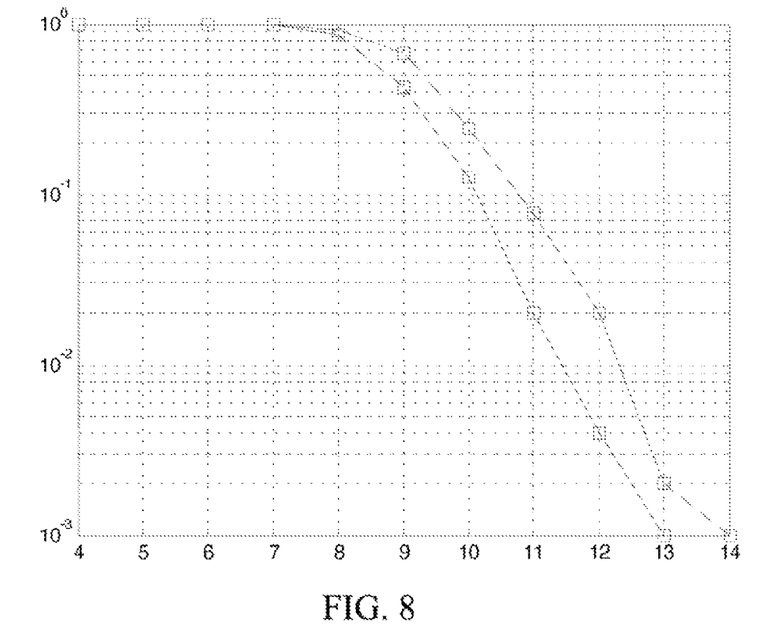
FIG. 8 is a schematic diagram of the performance comparison of different overlap lengths of the sliding windows for the service with the code length of 4367 and the puncturing ratio of 7.

According to the structure deduction of the encoder, when the puncturing ratio is 7, systematic bits which are not protected by check bits occur in pair in the period of 7, and the positions are respectively $7*k+pp-4$ and $7*k+pp-4+1$, wherein k is a positive integer. Therefore, these systematic bits are unable to be checked no matter what kind of decoding algorithms is adopted, and are only able to obtain the original performance of the BPSK modulation. Obviously, it is unable to be solved in the way of changing the overlap length of the sliding window. The simulation shown in FIG. 8 is the performance comparison of different overlap lengths of the sliding window in the case of the 4367 code and the puncturing ratio of 7, and the horizontal and vertical coordinates of FIG. 8 are the same with that of FIG. 3. The curve at the right side is the performance curve when the length of the window is 256 and the overlap length is 32; and the curve at the left side is the performance curve without the window.

Figure 9:
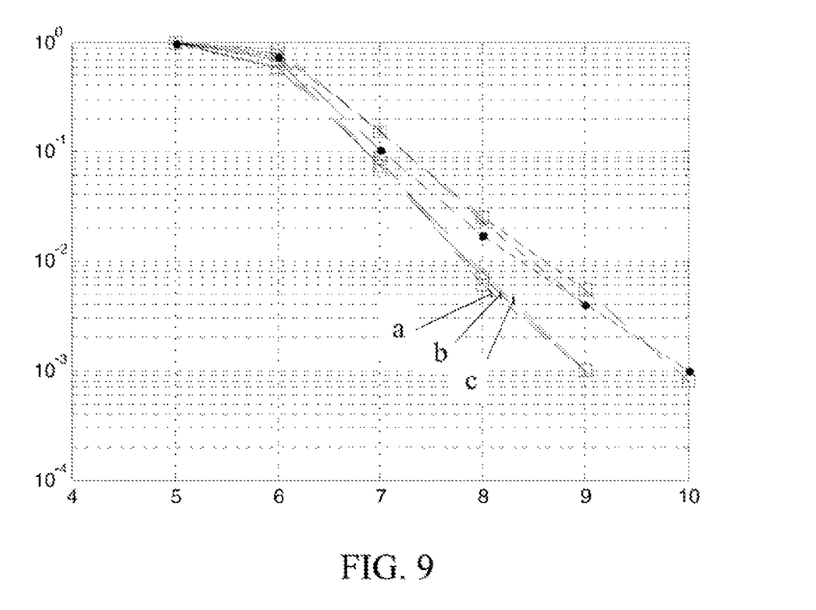
FIG. 9 is a schematic diagram of the performance when the overlap lengths respectively are 32, 64, 128, 256 and 512 and without sliding window and when the window length is 1024.

When the puncturing ratio is not equal to 7 accurately, the rate matching in the protocol adopts the principle as equalized as possible, for example, the service puncturing ratio with the code length of 4367 is 6.94, and the rate matching is implemented in the way of inserting one check bit with the puncturing ratio of 6 every 16 check bits with puncturing ratio of 7. The effect is that the phase pp is advanced by 1 phase after every 16 punctures with 7 from a perspective of the puncturing ratio of 7, and then puncturing with 7 is continued. It can be known from the above theory analysis that the positions of systematic bits without protection are the linear function of the phase pp, similarly advanced by 1 phase therewith, and all the phases will be traversed after 7 phase adjustments to make the current systematic bits without protection obtain protection from the check bits in the period. However, the check bit for protecting this systematic bit doesn't necessarily occur in the calculation result of the software information due to the limitation of the overlap length, when and only when the overlap length is much longer than the period of traversing phase, this point can be ensured. In the service with the code length of 4367, this period is 109, and in the case of the overlap being far greater than this period, there will be a plurality of check bits to provide check information for it so that the performance is improved. FIG. 9 shows the simulation with the window length of 1024, and there are overlap lengths which respectively are 32, 64, 128, 256 and 512 and the case without the sliding window, and the horizontal coordinate is SNR in the figure, and the vertical coordinate is BLER, wherein the three curves with frame, asterisk, and dot at the right side respectively correspond to the overlap length of 32, 64 and 128, and the three curves marked with "a", "c", and "b" at the left side respectively correspond to the overlap length of 512, 256 and the case without the window.

Figure 10:
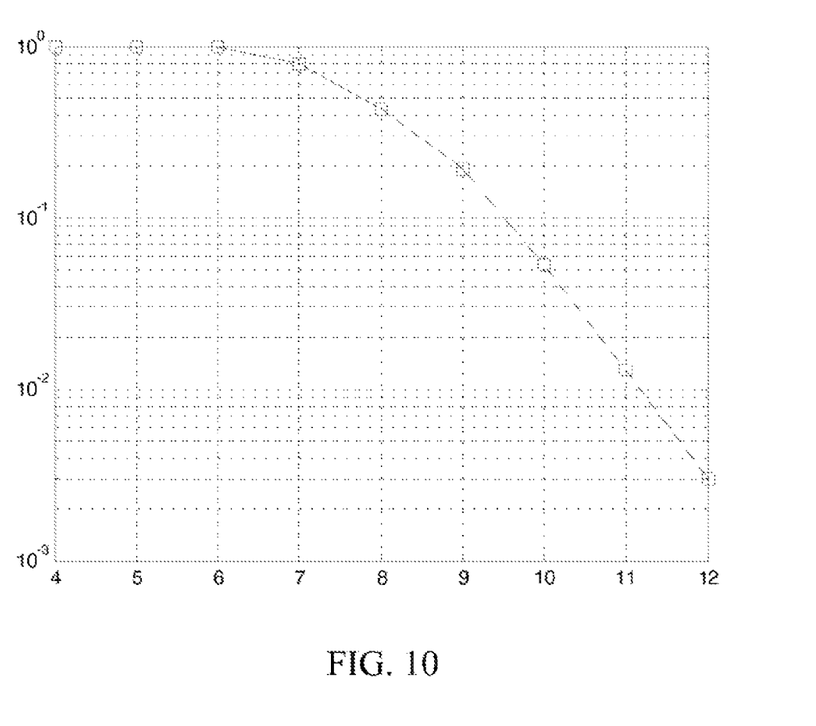
FIG. 10 is a schematic diagram of the performance when the window length is 256 and the overlap length is 32.

Considering the complexity of the practical hardware, the performance degrades more obviously since the occurrence times of the inaccurate inverse iteration initial values increase except the period overlap factor in the case that the typical parameters of the Turbo decoder designed by the current chip are that the window length is reduced to 256 but the overlap is still 32, and as shown in FIG. 10, the horizontal coordinate is SNR in the figure, and the vertical coordinate is BLER.

As a conclusion, the scenario of the puncturing ratio being 7 is a fatal defect of the encoder, and specific systematic bits are unable to be protected by the check bits all the time, which causes that Turbo encoding and decoding system in this scenario nearly loses the encoding gain completely, and is unable to be solved by decoding algorithms in this case. In the case that the puncturing ratio is close to 7, since the phase period adjustment makes the systematic bits losing the protection obtain the protection in the period, the large scale overlap will obtain a certain improvement of performance. However, although it is not considered that the implementation complexity infinitely increases the overlap, the degradation of the performance of this service with the puncturing ratio of 6.94 reaches up to at least 2 dB, comparing with the performance of the puncturing ratio of 6 and even the puncturing ratio of 8 with less practical transmitted data.

Based on the above analysis, the present invention provides a method for configuring a service of a TD-SCDMA system, which comprises:

traversing to search for a service of which a check bit puncturing ratio is within a range of [7i−a, 7i+a] in an existing service configuration, wherein said check bit puncturing ratio refers to a ratio of a summation of the number of check bit data before puncturing to a summation of the number of reserved check bit data after puncturing, i is a positive integer, and a≤1;

deleting a searched-out service of which the check bit puncturing ratio is within the range of [7i−a, 7i+a].

Said method for configuring the service can have a following characteristic, and the searched-out service of which the check bit puncturing ratio is within the range of [7i−a, 7i+a] is the service whose rate is 868.6 kbps, and the method further comprises: reserving other services in the service configuration.

Said method for configuring the service can further have a following characteristic: a≤0.5 or a≤0.3 or a≤0.1. The below schemes are all obtaining the values according to this, and it will not be repeated any more.

Based on the above analysis, the present invention further provides a method for configuring a service of a TD-SCDMA system, which comprises:

when configuring the service, take that a check bit puncturing ratio should be more than 7i+a or less than 7i−a as a newly added constraint condition, and the check bit puncturing ratios of each configured service are all outside the range of [7i+a, 7i−a], wherein said check bit puncturing ratio refers to a ratio of a summation of the number of check bit data before puncturing to a summation of the number of reserved check bit data after puncturing, i is a positive integer, and a≤1.

Said method for configuring the service can further have a following feature: the step of said check bit puncturing ratios of each configured service all being outside the range of [7i+a, 7i−a] further comprises: modifying a size of a transport block in a set of sizes of transport blocks of High Speed Downlink Packet Access (HSDPA) corresponding to each physical layer type of a High Speed-Downlink Shared Channel (HS-DSCH) to make said check bit puncturing ratios of each configured service transported by use of the HS-DSCH to be outside the range of [7i+a, 7i−a].

Based on the above analysis, the present invention further provides a method for configuring a service in a communication system, which is applied in a communication system which carries out data coding by use of a recursion encoder, and this method for configuring the service comprises:

determining a period T of periodically repeating systematic bit information used in a generation polynomial of check information of the recursion encoder in said communication system;

traversing to search for a service of which a check bit puncturing ratio is within a range of [T*i−a, T*i+a] in an existing service configuration of this communication system, wherein i is a positive integer, a≤1, and said check bit puncturing ratio refers to a ratio of a summation of the number of check bit data before puncturing to a summation of the number of reserved check bit data after puncturing; and deleting all searched-out services of which the check bit puncturing ratio is within the range of [7i−a, 7i+a].

Based on the above analysis, the present invention further provides a method for configuring a service in a communication system, which is applied in a communication system which carries out data coding by use of a recursion encoder, and this method for configuring the service comprises:

determining a period T of periodically repeating systematic bit information used in a generation polynomial of check information of the recursion encoder in said communication system;

when configuring the service, take that a check bit puncturing ratio should be more than T*i+a or less than T*i−a as a newly added constraint condition, and the check bit puncturing ratio of each configured service is outside a range of [T*i+a, T*i−a], wherein said check bit puncturing ratio refers to a ratio of a summation of the number of check bit data before puncturing to a summation of the number of reserved check bit data after puncturing, i is a positive integer, and a≤1.

The above method for configuring the service avoids the standard inherent defect that certain systematic bits of the Turbo code are unable to be checked all the time or the valid check bits are too far away from this systematic bit caused by the check bit puncturing. This standard inherent defect will cause the problem of the severe degradation of the performance of the terminal in certain service types.

Based on the above analysis, the present invention provides a method for rate matching of a TD-SCDMA system, which comprises:

in a process of rate matching, when puncturing each path of check bits of a current data block, if a difference between a position $P_k$ of a $k^{th}$ reserved check bit calculated according to a method defined by the service and a previously determined position $NP_k$ of a k−$1^{th}$ reserved check bit is a positive integral multiple of 7, determine the position $NP_k$ of the $k^{th}$ reserved check bit as $P_k$ plus 1 or $P_k$ minus 1, and $P_k$ plus 1 and $P_k$ minus 1 requires carrying out alternately;

wherein k=2, 3, . . . , a≤1, and said $P_k$ and $NP_{k-1}$ are denoted by indexes of corresponding check bits determined by a system before puncturing.

Said method for rate matching can further have a following feature: said method for rate matching is at least used for the rate matching of the service which uses Turbo encoding and of which a check bit puncturing ratio is within a range of [7i−a, 7i+a], i is a positive integer, and said check bit puncturing ratio refers to a ratio of a summation of the number of check bit data before puncturing to a summation of the number of reserved check bit data after puncturing.

Said method for rate matching can further have a following feature: for a position of a $1^{st}$ reserved check bit calculated according to a method defined by the service, directly determining this calculated position as the position of the $1^{st}$ reserved check bit; and if the difference between the $P_k$ and $NP_k$ is not the integral multiple of 7, directly determining the position $NP_k$ of the $k^{th}$ reserved check bit as $P_k$, k=2, 3, . . . .

Based on the above analysis, the present invention further provides a method for rate matching in a communication system, which is applied in a communication system which carries out data coding by use of a recursion encoder, and this method for rate matching comprises:

determining a period T of periodically repeating systematic bit information used in a generation polynomial of check information of the recursion encoder in said communication system;

in a process of caning out rate matching on current data block, when carrying out puncturing operation on each path of check bits, if a difference between a position $P_k$ of the check bit to be reserved currently calculated according to a method defined by a service and a determined position $NP_k$ of a previous reserved check bit is a positive integral multiple of T, determine the position of the check bit to be reserved currently as $P_k$ plus 1 or $P_k$ minus 1, or else directly determine the position of the check bit to be reserved currently as $P_k$, and carry out $P_k$ plus 1 and $P_k$ minus 1 alternately.

The above method for rate matching avoids the standard inherent defect that certain systematic bits of the Turbo code are unable to be checked all the time or the valid check bits are too far away from this systematic bit caused by the check bit puncturing, thereby avoiding the severe degradation of the performance of the terminal in certain service types.

Another technical problem to be solved in the present invention is to provide an apparatus for rate matching of the TD-SCDMA system, which can avoid the problem of the severe degradation of the decoding performance at certain specific data rates.

In order to solve the above technical problem, the present invention provides an apparatus for rate matching of the TD-SCDMA system, which comprises one bit separation unit, two matching operation units and one bit collection unit connected in sequence, wherein said matching operation units are configured to: in a process of carrying out rate matching on a service which uses Turbo encoding and of which a check bit puncturing ratio is within a range of [7i−a, 7i+a], when puncturing one path of check bits of the current data block, and if a difference between a position $P_k$ of the $k^{th}$ reserved check bit calculated according to a method defined by a service and a previously determined position $NP_{k-1}$ of a k−$1^{th}$ reserved check bit is a positive integral multiple of 7, determine a position $NP_k$ of a $k^{th}$ reserved check bit as $P_k$ plus 1 or $P_k$ minus 1 and carry out $P_k$ plus 1 and $P_k$ minus 1 alternately; wherein k=2, 3, . . . , a≤1, and said $P_k$ and $NP_{k-1}$ are denoted by indexes of corresponding check bits determined by a system before puncturing, and said check bit puncturing ratio refers to a ratio of a summation of the number of check bit data before puncturing to a summation of the number of reserved check bit data after puncturing.

The above apparatus for rate matching can avoid the problem of the severe degradation of the decoding performance at certain specific data rates.

PREFERRED EMBODIMENTS OF THE PRESENT INVENTION

Below it will describe the particular embodiment of the present invention in detail with reference to figures. The example one and example two respectively provide a method for configuring a service of the TD-SCDMA system, and the example three provides a method for rate matching of the TD-SCDMA system.

EXAMPLE ONE

In order to avoid the severe degradation of the decoding performance in certain data rates, this example avoids constituting services of which the check bit puncturing ratio is close to 7 and the positive integral multiple of 7 when configuring services for the TD-SCDMA system.

Figure 11:
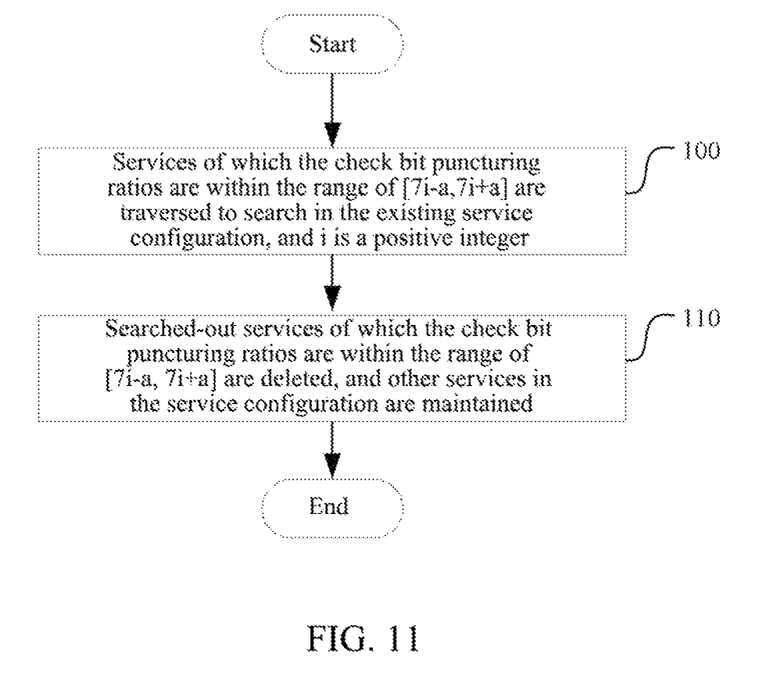
FIG. 11 is a flow chart of the method for configuring a service according to the example one of the present invention.

The method for configuring a service of this example comprises following steps:

step 100, traverse to search for services of which the check bit puncturing ratios are within the range of [7i−a, 7i+a] in the current service configuration, and i is a positive integer;

the simulation result denotes that the performance degradation is very severe and reaches up to at least 3 dB when the puncturing ratio is completely equal to 7; when the puncturing ratio is very close to 7, for example the difference is within 0.1 (6.9~7.1), the performance degradation is relatively severe; when the difference between the puncturing ratio and 7 is within 0.3 (6.7~7.3), the performance degradation is obvious; when the difference between the puncturing ratio and 7 is within 0.5 (6.5~7.5), the performance degradation can be observed; and when the difference between the puncturing ratio and 7 is within 1 (6~7), the performance will be affected.

Thus, the value range of a is a≤1, and in different examples, the values of a can be different, such as 0.5, 0.3, 0.1 and so on.

Step 110, the searched-out services of which the check bit puncturing ratios are within the range of [7i−a, 7i+a] are deleted, and other services in the service configuration are maintained unchanged;

in the current existing service configuration, only a service with a data rate of 868.6 kbps is found, and according to the parameter configured in the standard, the check bit puncturing ratio is 6.94, which is very close to 7, and this service is deleted in the service configuration, and other reserved services compose a new service type list. Certainly, if there is not a service of which the check bit puncturing ratio is within the range of [7i−a, 7i+a], the existing service configuration does not require changing.

This method does not need to modify the existing service type list on a large scale, and it is with less modification on the current standard. However, the data rate of the left service list after deleting the service with the problem is not equalized enough and the front and back of the position of the deleted service have larger service rate hopping.

EXAMPLE TWO

This example re-configures the service type list based on avoiding the check bit puncturing ratios being close to 7 and the positive integral multiple of 7. The configured service type list takes that the check bit puncturing ratio should be more than 7i+a or less than 7i−a as a newly added constraint condition besides satisfying the original configuration principle of the service type list, namely, the newly configured service type list does not have the service of which the check bit puncturing ratio is within the range of [7i−a, 7i+a], i is a positive integer, and a≤1, such as 0.5, 0.3, 0.1 and so on.

Taking the TD-SCDMA system as an example, the channel bearing the data service in the High Speed Downlink Packet Access (HSDPA) technique is the High-Speed Downlink Shared Channel (HS-DSCH), and the size of its transport block is derived according to the Transport Format Resource Indicator (TFRI) information born on the HS-SCCH channel, whereas the mapping relationship between the size of the transport block and the TFRI information depends on the HS-DSCH capability level of UE.

In the Chinese industry standard "Technical Specification for 2 GHz TD-SCDMA Digital Cellular Mobile Communication Network: High Speed Uplink Packet Access (HSUPA) Uu Interface Layer 2 Part 1: MAC Protocol", table 12~table 16 respectively provide the sets of the sizes of the corresponding HSDPA transport blocks when types of the HS-DSCH physical layer are [1, 3], [4, 6], [7, 9], [10, 12] and [13, 15].

These sizes of the transport blocks are calculated according to following formulas:

$$L_k = \lfloor L_{min} p^{k-1} \rfloor, k=1, 2, \ldots, 62$$

wherein $$p = \frac{6214}{5973},$$

if the type of the HS-DSCH physical layer is in the closed interval from 1 to 3;

$$p = \frac{1292}{1228},$$

if the type of the HS-DSCH physical layer is in the closed interval from 4 to 6;

$$p = \frac{1901}{1795},$$

if the type of the HS-DSCH physical layer is in the closed interval from 7 to 9;

$$p = \frac{9445}{8877},$$

if the type of the HS-DSCH physical layer is in the closed interval from 10 to 12; and $$p = \frac{2345}{2196},$$

if the type of the HS-DSCH physical layer is in the closed interval from 13 to 15.

and $L_{min}=240$.

In order to avoid that the check bit puncturing ratios of the services are within the range of [7i−a, 7i+a], one way is to modify the value of p in the above formula, and other related parameters can be invariable, or also can be adjusted, so that the check bit puncturing ratio of service to which the size of each transport block obtained in the five intervals of the physical layer types is mapped, is able to avoid the range of [7i−a, 7i+a], namely:

$$p = \frac{M_1}{N_1},$$

if the type of the HS-DSCH physical layer is in the closed interval from 1 to 3;

$$p = \frac{M_2}{N_2},$$

if the type of the HS-DSCH physical layer is in the closed interval from 4 to 6;

$$p = \frac{M_3}{N_3},$$

if the type of the HS-DSCH physical layer is in the closed interval from 7 to 9;

$$p = \frac{M_4}{N_4},$$

if the type of the HS-DSCH physical layer is in the closed interval from 10 to 12;

$$p = \frac{M_5}{N_5},$$

if the type of the HS-DSCH physical layer is in the closed interval from 13 to 15.

If the HS-DSCH capability level of the UE is further extended, then the similar method should be used to calculate the size of the transport block in the newly added physical layer type so as to make the check bit puncturing ratio of the service is not within the range of [7i−a, 7i+a].

The above method for configuring the service of TD-SCDMA in the two examples avoids the standard inherent defect that certain systematic bits of the Turbo code are unable to be checked all the time or the valid check bits are too far away from this systematic bit caused by the check bit puncturing. The problem of the severe degradation of the performance of the terminal in certain service types caused by this standard inherent defect is avoided. Besides, it is not required to modify the existing hardware devices such as all the receiving and sending devices and so on.

EXAMPLE THREE

This example does not adjust the existing service configuration of the TD-SCDMA system. In the process of carrying out rate matching on the current data blocks, when the puncturing operation is carried out on each path of check bits, and if the difference between the position $P_k$ of the $k^{th}$ reserved check bit calculated according to the method defined by the service and the determined position $NP_k$ of the previous reserved check bit is 7i (i is a positive integer), then the position of the current check bit to be reserved is determined as the $P_k$ plus 1 or $P_k$ minus 1, or else, the position of the current check bit to be reserved is directly determined as the $P_k$, and $P_k$ plus 1 and $P_k$ minus 1 are alternately carried out. This way of rate matching can avoid the degradation of the decoding performance of the Turbo code on the premise of maintaining the original check bit puncturing ratio unchanged basically. $P_k$ can be calculated by the rate matching parameter of the service, and the different between the $NP_k$ and $P_k$ can be calculated by the index of the corresponding check bits determined by the system before puncturing, and k=2, 3, . . . .

The method for rate matching of this example can be only used for the service of which the check bit puncturing ratio is within the range of [7i−a, 7i+a], a≤1, for example 0.5, 0.3 and 0.1, and also can be not limited by this and used for various services.

The positions of the reserved check bits can be re-determined according to a following particular flow:

step one, the position $P_1$ of the $1^{st}$ reserved check bit before puncturing is calculated according to the algorithm defined by the service, and this $P_1$ is directly taken as the position $NP_1$ of the re-determined $1^{st}$ reserved check bit before puncturing;

step two, when the position of the $k^{th}$ reserved check bit before puncturing is re-determined, firstly the position $P_k$ of the $k^{th}$ reserved check bit before puncturing is calculated according to the algorithm defined by the service, k=2, 3, . . . , N, and N is the number of the reserved check bits in the current data block;

step three, it is judged whether the difference of $P_k-NP_{k-1}$ is equal to 7 or the positive integral multiple of 7, and if yes, step four is carried out, or else, step five is carried out;

step four, if $NP_{k-1}-NP_{k-2}>7$ or k=2, then $NP_k=P_k-1$, or else, $NP_k=P_k+1$, step six is carried out;

when k=2, $NP_k=P_k-1$, which is equivalent to the original check bit puncturing ratio minus 1 when the difference between the $1^{st}$ and $2^{nd}$ reserved check bits is 7, and certainly, in another example, the original check bit puncturing ratio also can be added by 1 at first.

Step five, $NP_k=P_k$, and step six is carried out;

step six, it is judged whether k is less than N, and if yes, k=k+1, and step two is carried out, or else, the processing is ended.

The above method can be particularly applied in the process of the base station of the TD-SCDMA system carrying out the rate matching, and avoids the standard inherent defect that certain systematic bits of the Turbo code are unable to be checked all the time or the valid check bits are too far away from this systematic bit caused by the check bit puncturing, thereby avoiding the severe degradation of the performance of the terminal in certain service types.

Correspondingly, this example further provides an apparatus for rate matching, and with reference to FIG. 2, this apparatus comprises a bit separation unit, two matching operation units and a bit collection unit, wherein in a process of the matching operation unit carrying out rate matching on a service which uses Turbo encoding and of which a check bit puncturing ratio is within the range of [7i−a, 7i+a], when puncturing one path of check bits of the current data block, and if the difference between the position $P_k$ of the $k^{th}$ reserved check bit calculated according to the method defined by the service and the previously determined position $NP_{k-1}$ of the k−$1^{th}$ reserved check bit is a positive integral multiple of 7, determine the position $NP_k$ of the $k^{th}$ reserved check bit as $P_k$ plus 1 or $P_k$ minus 1 and carry out $P_k$ plus 1 and $P_k$ minus 1 alternately; wherein k=2, 3, . . . , a≤1, and said $P_k$ and $NP_{k-1}$ are denoted by indexes of corresponding check bits determined by the system before puncturing, and said check bit puncturing ratio refers to a ratio of a summation of the number of check bit data before puncturing to a summation of the number of reserved check bit data after puncturing.

The above apparatus for rate matching can be implemented by the hardware, and also can be implemented by software.

Below it will be described by an application example.

It is assumed that the puncturing operation is carried out on the check bit of the current data block, and the total length of the data block of the check bit to be punctured is 100. At first, the initial alternation times variable T=0. The position of the $k^{th}$ reserved check bit before puncturing calculated according to the original method is defined as $P_k$, and the position of the $k^{th}$ reserved check bit before puncturing calculated according to the method of the present invention is defined as $NP_k$.

The positions of each reserved check bit before puncturing obtained according to the original method are as shown in the following table, wherein, $P_1$=1, $P_2$=8, $P_3$=15, $P_4$=22, . . . , and $P_{15}$=99, and the distances between each reserved check bit are all 7.

TABLE 1

| Sequence index after puncturing | Position before puncturing |
|---|---|
| 1 | 1 |
| 2 | 8 |
| 3 | 15 |
| 4 | 22 |
| 5 | 29 |
| 6 | 36 |
| 7 | 43 |
| 8 | 50 |
| 9 | 57 |
| 10 | 64 |
| 11 | 71 |
| 12 | 78 |
| 13 | 85 |
| 14 | 92 |
| 15 | 99 |

When the rate matching is carried out, a following flow is adopted to re-calculate the positions of various reserved check bits before puncturing:

```
when k=1, NP₁=P₁;
a cycle makes k=2 to N
    calculating DP=P_k−NP_{k−1};
    if DP is the multiple of 7
        if T=0, then NP_k=P_k−1, T=!T;
        if T=1, then NP_k=P_k+1, T=!T;
    or else NP_k=P_k;
the cycle ends
``` wherein T=!T is a NON operation, when T=0, the operation result is 1, and when T=1, the operation result is 0. N is the number of the reserved check bits in the current data block.

The result obtained by use of the above method is: $NP_1$=1, $P_2$=7, $P_3$=15, $P_4$=21, . . . , and $P_{15}$=99, as shown in the following table 2:

TABLE 2

| Sequence index after puncturing | Position before puncturing |
|---|---|
| 1 | 1 |
| 2 | 7 |
| 3 | 15 |
| 4 | 21 |
| 5 | 29 |
| 6 | 35 |
| 7 | 43 |
| 8 | 49 |
| 9 | 57 |
| 10 | 63 |
| 11 | 71 |
| 12 | 77 |
| 13 | 85 |
| 14 | 91 |
| 15 | 99 |

It can be seen that the above method avoids the occurrence of the case that the check bit puncturing ratio is the multiple of 7.

EXAMPLE FOUR

It has been mentioned in the analysis of the section of "Summary of the Invention" that the reason for the performance degradation is mainly that the systematic bit information for use by the generation polynomial of the check information of the systematic recursion encoder occurs in the period of 7, and the puncturing way should avoid the same period with this expression to be able to ensure that each systematic bit is protected by the check bit in the case of the sufficient code length. This principle is not limited to the TD-SCDMA system or Turbo encoder, and also can be applicable to the communication systems of carrying out the data coding using the recursion encoder.

Therefore, this example further provides a method for configuring a service, which is applied in a communication system of carrying out the data coding using the recursion encoder, and the method comprises following steps:

determine a period T of periodically repeating systematic bit information used in the generation polynomial of check information of the recursion encoder in said communication system;

traverse to search for a service of which the check bit puncturing ratio is within the range of [T*i−a, T*i+a] in the existing service configuration of the communication system, and i is a positive integer, and similarly, a≤0.5, for example 0.5, 0.3 and 0.1 and so on;

delete the searched-out service of which the check bit puncturing ratio is within the range of [T*i−a, T*i+a], and maintaining other services unchanged in the service configuration.

EXAMPLE FIVE

Based on the above principle, this example expands the method for configuring a service in example two, which is applied in a communication system of carrying out the data coding using the recursion encoder.

At first, determine a period T of periodically repeating systematic bit information used in the generation polynomial of check information of the recursion encoder in said communication system;

the service type list is re-configured based on avoiding check bit puncturing ratios within the range of (T*i−a)~(T*i+a), and the configured service type list takes that the check bit puncturing ratio should be more than (T*i+a) or less than (T*i−a) as a newly added constraint condition besides satisfying the original configuration principle of the service type list, so that the newly configured service type list doesn't have the service of which the check bit puncturing ratio is close to 7 or the positive integral multiple of 7, wherein T is the period of periodically repeating systematic bit information used in the generation polynomial of check information of the recursion encoder in said communication system, i is a positive integer, and a≤1, such as 0.5, 0.3, 0.1 and so on.

EXAMPLE SIX

Based on the above principle, this example expands the method for rate matching in example three, which is applied in a communication system of carrying out the data coding using the recursion encoder.

At first, determine a period T of periodically repeating systematic bit information used in the generation polynomial of check information of the recursion encoder in said communication system;

in the process of carrying out rate matching on the current data blocks, when the puncturing operation is carried out on each path of check bits, if the difference between the position $P_k$ of the check bit to be reserved currently calculated according to the method defined by the service and the determined position $NP_k$ of the previous reserved check bit is a positive integral multiple of T, the position of the current check bit to be reserved is determined as the $P_k$ plus 1 or $P_k$ minus 1, or else, the position of the current check bit to be reserved is directly determined as the $P_k$, and $P_k$ plus 1 and $P_k$ minus 1 should be carried out alternately. This way of rate matching can avoid the degradation of the decoding performance of the Turbo code on the premise of reserving the original check bit puncturing ratio unchanged basically. The above difference between $NP_k$ and $P_k$ can be calculated by the index of the corresponding check bits determined by the system.

In terms of the performance only, the occurrence of a small quantity of the cases that the difference of the positions of two adjacent reserved check bits is 7 will not have a large effect on the performance, and thus the above constraint condition can be relaxed appropriately, for example, it is ensured that the occurrence of difference of the positions of two adjacent reserved check bits being 7 will not take place continuously.
Industrial Applicability The method and apparatus for configuring the service and rate matching of the TD-SCDMA system provided in the present invention avoid the standard inherent defect that certain systematic bits of the Turbo code are unable to be checked all the time or the valid check bits are too far away from this systematic bit caused by the check bit puncturing and avoid the problem of severe degradation of the decoding performance at certain specific data rates.

What is claimed is:

1. A method for configuring a service in a Time Division Synchronous Code Division Multiple Access (TD-SCDMA) system comprising:
   in the Time Division Synchronous Code Division Multiple Access (TD-SCDMA) system which include at least one Turbo Encoder, implementing following steps:
   from the current services searching, by a base station of the TD-SCDMA, for the services with the configuration that the check bit puncturing ratio is within the range of [7i−a, 7i+a], wherein said check bit puncturing ratio is the ratio between the total count of the number of the check bits before the puncturing and the count of the number of the remaining check bits after the puncturing; and wherein i is a positive integer, and 0≤a≤1;
   removing the services, by the base station of the TD-SCDMA, that were searched out in the previous step.

2. The method for configuring the service as claimed in claim 1, wherein a≤0.5 or a≤0.3 or a≤0.1.

3. The method for configuring the service as claimed in claim 1, wherein said services that were searched out is the services of which the data rate is 868.6 kbps, and this method further comprises: reserving other services in the service configuration.

4. A method for configuring a service in a Time Division Synchronous Code Division Multiple Access (TD-SCDMA) system, comprising:
   in the Time Division Synchronous Code Division Multiple Access (TD-SCDMA) system which include at least one Turbo Encoder, implementing following steps:
   when configuring the services, by a base station of the TD-SCDMA, taking that the check bit puncturing ratio should be more than 7i+a or less than 7i−a as a newly added constraint condition making the check bit puncturing ratios of each configured service being outside of the range of [7i+a, 7i−a],
   wherein said check bit puncturing ratio is the ratio between the total count of the number of the check bits before the puncturing and the count of the number of the remaining check bits after the puncturing; and wherein i is a positive integer, and 0≤a≤1.

5. The method for configuring the service as claimed in claim 4 further comprising: wherein a≤0.5 or a≤0.3 or a≤0.1.

6. The method for configuring the service as claimed in claim 4 further comprising:
   wherein, making the check bit puncturing ratios of each configured service being outside of the range of [7i+a, 7i−a] in following way:
   modifying the transport block size within the set of sizes of transport blocks of High Speed Downlink Packet Access (HSDPA) corresponding to each physical layer type of a High Speed-Downlink Shared Channel (HS-DSCH).

7. A method for rate matching in a Time Division Synchronous Code Division Multiple Access (TD-SCDMA) system, comprising:
   in the Time Division Synchronous Code Division Multiple Access (TD-SCDMA) system which include at least one Turbo Encoder, implementing followina steps:
   in the process of rate matching, by a base station of the TD-SCDMA, during the process of puncturing on each path of check bits of a current data block, when the difference between the $k^{th}$ reserved check bit $P_k$ calculated with the method defined by the service and the previously determined k−$1^{th}$ reserved check bit $NP_{k-1}$ is a positive integral multiple of 7, making the $k^{th}$ reserved check bit $NP_k$ as $P_k$ plus 1 or $P_k$ minus 1 alternately;
   wherein k=2, 3, . . . , 0≤a≤1, and said $P_k$ and $NP_{k-1}$ are the notations of the corresponding check bits determined by the system before puncturing.

8. The method for rate matching as claimed in claim 7, wherein a≤0.5 or a≤0.3 or a≤0.1.

9. The method for rate matching as claimed in claim 7, wherein
   said method for the rate matching is at least used for the rate matching of the service which uses Turbo encoding and of which a check bit puncturing ratio is within a range of [7i−a, 7i+a], i is a positive integer, and said check bit puncturing ratio refers to a ratio of a summation of the number of check bit data before puncturing to a summation of the number of reserved check bit data after puncturing.

10. The method for rate matching as claimed in claim 7 further comprises:
for the position of the 1st reserved check bit calculated according to the method defined by the service, directly determining this calculated position as the position of the 1st reserved check bit; and
when the difference between the $P_k$ and $NP_k$ is not the integral multiple of 7, directly determining the $k^{th}$ reserved check bit $NP_k$ as $P_k$, wherein, k=2, 3, . . . .

11. A method for configuring a service in a communication system comprising:
in a communication system which include at least one Recursive Encoder, implementing following steps:
determining a period T, by a base station of the communication system, wherein the period T is the period of the periodically repeating of the systematic bit information used in a generation polynomial of check information of the recursion encoder in said communication system;
from the current services of said communication system searching, by the base station of the communication system, for the services of which the check bit puncturing ratio is within the range of [T*i−a, T*i+a], wherein i is a positive integer, and 0≤a≤1, and said check bit puncturing ratio is the ratio between the total count of the number of the check bit before the puncturing and the count of the number of the remaining check bit after the puncturing; and
removing the services, by the base station of the communication system, that were searched out in the previous step.

12. The method for configuring the service as claimed in claim 11, wherein a≤0.5 or a≤0.3 or a≤0.1.

13. A method for configuring a service in a communication system comprising:
in a communication system which include at least one Recursive Encoder, implementing following steps:
determining a period T, by a base station of the communication system, wherein the period T is the period of periodically repeating systematic bit information used in a generation polynomial of check information of the recursion encoder in said communication system;
when configuring the service, by the base station of the communication system, taking that a check bit puncturing ratio should be more than T*i+a or less than T*i−a as a newly added constraint condition making the check bit puncturing ratios of each configured service being outside a range of [T*i−a, T*i+a],
wherein said check bit puncturing ratio is the ratio between the total count of the number of the check bit before the puncturing and the count of the number of the remaining check bit after the puncturing; and wherein i is a positive integer, and 0≤a≤1.

14. The method for configuring the service as claimed in claim 13, wherein a≤0.5 or a≤0.3 or a≤0.1.

15. A method for rate matching in a communication system comprising:
in a communication system which include at least one Recursive Encoder, implementing following steps:
determining a period T, by a base station of the communication system, wherein the period T is the period of periodically repeating systematic bit information used in a generation polynomial of check information of the recursion encoder in said communication system;
in the process of carrying out rate matching on the current data block, by the base station of the communication system, when carrying out puncturing operation on each path of check bits, when the difference between a position $P_k$ of a check bit to be reserved currently calculated according to a method defined by a service and the determined position $NP_k$ of the previous reserved check bit is a positive integral multiple of T, determining the position of the check bit to be reserved currently as $P_k$ plus 1 or $P_k$ minus 1, otherwise directly determining the position of the check bit to be reserved currently as $P_k$, and carrying out $P_k$ plus 1 and $P_k$ minus 1 alternately.

16. An apparatus for rate matching in a Time Division Synchronous Code Division Multiple Access (TD-SCDMA) system comprising:
one bit separation unit, two matching operation units and one bit collection unit; wherein,
said matching operation units are configured to: in a process of carrying out rate matching on a service which uses Turbo encoding and of which a check bit puncturing ratio is within a range of [7i−a, 7i+a], when carrying out puncturing on one path of check bits of a current data block, and when the difference between the $k^{th}$ reserved check bit $P_k$ calculated according to a method defined by a service and the k−1$^{th}$ reserved check bit $NP_{k-1}$ is a positive integral multiple of 7, determine the $k^{th}$ reserved check bit $NP_k$ as $P_k$ plus 1 or $P_k$ minus 1 alternately; wherein k=2, 3, . . . , 0≤a≤1, and said $P_k$ and $NP_{k-1}$ are denoted by indexes of corresponding check bits determined by system before puncturing, and said check bit puncturing ratio is the ratio between the total count of the number of the check bits before the puncturing and the count of the number of the remaining check bits after the puncturing.

17. The apparatus for rate matching as claimed in claim 16, wherein a≤0.5 or a≤0.3 or a≤0.1.

18. The method for configuring the service as claimed in claim 5, wherein
the step of said check bit puncturing ratios of each configured service all being outside the range of [7i+a, 7i−a] further comprises: modifying a size of a transport block in a set of sizes of transport blocks of High Speed Downlink Packet Access (HSDPA) corresponding to each physical layer type of a High Speed-Downlink Shared Channel (HS-DSCH), so that said check bit puncturing ratios of each configured service transported by use of the HS-DSCH are all outside the range of [7i+a, 7i−a].

19. The method for rate matching as claimed in claim 8, wherein
said method for the rate matching is at least used for the rate matching of the service which uses Turbo encoding and of which a check bit puncturing ratio is within a range of [7i−a, 7i+a], i is a positive integer, and said check bit puncturing ratio refers to a ratio of a summation of the number of check bit data before puncturing to a summation of the number of reserved check bit data after puncturing.

20. The method for rate matching as claimed in claim 8 further comprises:
for the position of the 1st reserved check bit calculated according to the method defined by the service, directly determining this calculated position as the position of the 1st reserved check bit; and
when the difference between the $P_k$ and $NP_k$ is not the integral multiple of 7, directly determining the $k^{th}$ reserved check bit $NP_k$ as $P_k$, wherein, k=2, 3, . . . N and N is the number of the reserved check bits in the current data block.

* * * * *